(12) United States Patent
Steiner et al.

(10) Patent No.: US 7,677,157 B2
(45) Date of Patent: Mar. 16, 2010

(54) HOT BEVERAGE MAKER WITH FLOATING FLUID LEVEL GAUGE

(75) Inventors: Mark C. Steiner, Richmond, VA (US); Martin P. Brady, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 638 days.

(21) Appl. No.: 11/567,911

(22) Filed: Dec. 7, 2006

(65) Prior Publication Data

US 2008/0134900 A1  Jun. 12, 2008

(51) Int. Cl.
*A47J 31/00* (2006.01)
(52) U.S. Cl. .......................................... 99/285; 99/307
(58) Field of Classification Search .................. 99/285, 99/320, 302 R, 304, 305, 306, 307; 73/309, 73/305, 319, 322, 322.5
See application file for complete search history.

(56) References Cited

U.S. PATENT DOCUMENTS

| | | | | |
|---|---|---|---|---|
| 325,100 | A * | 8/1885 | Marden | 126/388.1 |
| 377,533 | A | 2/1888 | Palmer | |
| 418,289 | A | 12/1889 | Ingram | |
| 717,309 | A | 12/1902 | Wiesner | |
| 1,663,485 | A | 3/1928 | Pierce | |
| 1,778,840 | A * | 10/1930 | Wale | 73/322 |
| 2,497,694 | A | 2/1950 | Shakin | |
| 2,807,960 | A * | 10/1957 | Schweitzer | 73/322 |
| 3,122,017 | A * | 2/1964 | Barr et al. | 73/322 |
| 3,848,563 | A * | 11/1974 | Brown | 73/322 |
| 4,713,253 | A | 12/1987 | Stone, Jr. | |
| 5,239,914 | A | 8/1993 | Salomon et al. | |
| 5,638,740 | A | 6/1997 | Cai | |
| D399,698 | S | 10/1998 | Saltet | |
| D446,990 | S | 8/2001 | Prat | |
| 6,425,317 | B1 | 7/2002 | Simmons | |
| 6,530,274 | B1 * | 3/2003 | Philbeck | 73/314 |
| D478,242 | S | 8/2003 | Garman | |
| D483,214 | S | 12/2003 | Holderfield et al. | |
| 6,810,789 | B2 * | 11/2004 | Chung et al. | 99/299 |
| 6,820,763 | B2 | 11/2004 | Bilskie et al. | |
| 6,892,627 | B2 | 5/2005 | Lalanne-Eygun | |
| D514,866 | S | 2/2006 | Brady | |
| D514,867 | S | 2/2006 | Steiner | |
| 7,024,984 | B2 | 4/2006 | Leung et al. | |
| 2005/0257691 | A1 | 11/2005 | Colman et al. | |
| 2006/0112832 | A1 | 6/2006 | Barraclough et al. | |

* cited by examiner

*Primary Examiner*—Reginald L Alexander
(74) *Attorney, Agent, or Firm*—Thomas, Karceski, Raring & Teague, P.C.

(57) ABSTRACT

A hot beverage maker comprises a stand, a water reservoir, a filter basket to hold beverage grinds to be brewed, a brewed beverage tank for holding a brewed beverage, a dispenser for dispensing the brewed beverage from the brewed beverage tank, and a floating brewed beverage level indicator. The floating indicator is adapted to protrude through an aperture in a wall of the brewed beverage tank. At least a portion of the indicator is buoyant and floats on a surface of the brewed beverage. A portion of the indicator protrudes through the aperture to indicate an amount of the brewed beverage in the brewed beverage tank.

9 Claims, 6 Drawing Sheets

HOT BEVERAGE MAKER WITH FLOATING FLUID LEVEL GAUGE

FIELD OF THE INVENTION

The present invention relates to a convenient hot beverage maker having a cup-actuated dispenser thereby allowing a user to dispense any amount of beverage desired, and, more particularly, pertains to a brew tank for such a hot beverage maker wherein the brew tank includes a floating fluid level gauge.

BACKGROUND OF THE INVENTION

Hot beverage makers, such as coffee makers, have been known and sold for many years using various brewing techniques. The typical and traditional coffee maker includes a stand or tower that has a warming plate forming the bottom or base of the tower with a filter basket located above the warming plate. The interior of the tower defines, at least in part, a fresh water reservoir. Such coffee makers further include a fluid reservoir, such as a glass carafe, that rests on the warming plate beneath the filter basket. Alternatively, the fluid reservoir may be an insulated carafe, in which case the warming plate is typically omitted.

In use, an operator fills the carafe in order to transfer water to the fresh water reservoir. The water is heated and passed through the filter basket, which includes the grounds to be infused. The brewed beverage then flows from the basket into the carafe. The beverage is maintained at an elevated temperature via the warming plate upon which the carafe rests, in the case of a glass carafe, or by the insulating properties of the carafe in the case of an insulated carafe.

A new variation of coffee maker has been developed wherein a brewed beverage tank is included, such as the coffee makers described in commonly assigned U.S. Pat. No. 6,564,975 to Garman, issued May 20, 2003, and U.S. Pat. No. 6,681,960 to Garman, issued Jan. 27, 2004, the contents of which are incorporated herein in their entirety. Briefly, the brewed beverage tank holds the filter basket above a reservoir portion. Hot water passes through the filter basket and a material to be infused (e.g., ground coffee beans). The brewed beverage is then collected and held in the reservoir portion of the brewed beverage tank ("brew tank"). A dispenser actuator is depressed that opens an outlet port in the reservoir. A user simply actuates the dispenser actuator with a mug or cup and the brewed beverage passes through the outlet to the operator's container.

In order to allow a user to determine the amount of brewed coffee within the device, a transparent window on the coffee holding reservoir can be used. A transparent vertical slot-type window on the side of the holding reservoir can also be used. Also known is the use of a buoyant ball contained within a transparent column, the transparent column containing coffee at the same level as in the holding reservoir and the ball floating on the surface of the coffee in the column. The transparent column typically includes markings that correspond to the quantity of coffee in the reservoir, such that the quantity of coffee in the reservoir may be determined by reading the marking nearest the floating ball.

However, these transparent windows, slots, and columns give a somewhat rough estimate of how much coffee remains and often do not give a clear indication of the exact amount. In addition, the amount of coffee remaining in the coffee maker is often difficult to gauge as the coffee may be difficult to see against the background of the coffee maker which is often somewhat similar in color to the coffee itself. Further, the glass or plastic of the these transparent windows, slots, and columns may be quickly stained by the coffee, such that the transparency is greatly reduced and the amount of coffee becomes difficult or impossible to determine. Because of the above problems, even when the amount of coffee may be determined at a short distance from the coffee maker via these transparent windows, slots, and columns, it may be difficult or impossible to determine the amount of coffee at a greater distance, such as across a room.

There is a need, therefore, for a coffee level indicator that is accurate, reliable, clearly indicates the amount of brewed coffee remaining in the holding reservoir, is unaffected by staining, and is readable at a distance. The operation and structure of a brew tank with an integrated fluid gauge in accordance with the present invention would solve one or more of these or other needs.

BRIEF SUMMARY OF THE INVENTION

The object of the present invention is to overcome the aforementioned drawbacks and to provide a hot beverage maker with a floating fluid level gauge that protrudes from the brew tank.

In one embodiment of the invention, a hot beverage maker comprises a stand, a water reservoir, a filter basket to hold beverage grinds to be brewed, a brewed beverage tank for holding a brewed beverage, a dispenser for dispensing the brewed beverage from the brewed beverage tank, and a floating brewed beverage level indicator. The floating indicator is adapted to protrude through an aperture in a wall of the brewed beverage tank. At least a portion of the indicator is buoyant and floats on a surface of the brewed beverage. A portion of the indicator protrudes through the aperture to indicate an amount of the brewed beverage in the brewed beverage tank.

In one embodiment, the wall may be a top wall. In such an embodiment, a varying portion of the indicator protrudes through the aperture as the amount of the brewed beverage in the brewed beverage tank varies, such that the varying portion indicates the amount of the brewed beverage in the brewed beverage tank. The indicator may comprise a plurality of markings spaced apart along the protruding portion of the indicator, such that a varying number of markings are visible outside of the hot beverage maker as the varying portion of the indicator protrudes through the aperture. As such, the number of visible markings indicates the amount of the brewed beverage in the brewed beverage tank. Each of the visible markings may include a label corresponding to a different amount of brewed beverage in the brewed beverage tank.

In another embodiment, the wall is a side wall. In such an embodiment, a position of the protruding portion relative to the aperture varies as the amount of the brewed beverage in the brewed beverage tank varies, such that the position indicates the amount of the brewed beverage in the brewed beverage tank. A portion of the side wall adjacent the aperture may comprise a plurality of markings spaced apart along the aperture, such that the position of the protruding portion relative to the markings indicates the amount of the brewed beverage in the brewed beverage tank. Each marking may include a label corresponding to a different amount of brewed beverage in the brewed beverage tank.

The hot beverage maker may further comprise an indicator guide adapted to enable movement of the indicator only along one axis and between two points along the axis. The indicator guide may be attached to an inner wall of the brewed beverage tank. The indicator guide may comprise a sleeve defining a cylindrical void, such that the indicator is positioned within the void.

The floating indicator may comprise a cylinder. The buoyant portion of the indicator may comprise a first cylinder with a first diameter, and the protruding portion of the indicator may comprise a second cylinder with a second diameter smaller than the first diameter. The protruding portion of the indicator may be positioned substantially perpendicular to the side wall. In another embodiment of the invention, a hot beverage maker comprises a stand, a water reservoir, a filter basket to hold beverage grinds to be brewed, a brewed beverage tank for holding a brewed beverage, a dispenser for dispensing the brewed beverage from the brewed beverage tank, and a floating brewed beverage level indicator. The floating indicator comprises a buoyant portion located within the brewed beverage tank and adapted to float on a surface of the brewed beverage, an indicating portion adapted to protrude through an aperture in a wall of the hot beverage maker, and a connecting portion adapted to traverse a top edge of a wall of the brewed beverage tank to connect the buoyant portion and the indicating portion. A position of the protruding portion relative to the aperture varies as an amount of the brewed beverage in the brewed beverage tank varies, such that the position indicates the amount of the brewed beverage in the brewed beverage tank. The wall of the brewed beverage tank may be a first beverage tank wall and the wall having the aperture may be a second beverage tank wall.

A portion of the wall adjacent the aperture may comprise a plurality of markings spaced apart along the aperture, such that the position of the protruding portion relative to the markings indicates the amount of the brewed beverage in the brewed beverage tank. Each marking may include a label corresponding to a different amount of brewed beverage in the brewed beverage tank.

The hot beverage maker may further comprise an indicator guide adapted to enable movement of the indicator only along one axis and between two points along the axis. The indicator guide may be attached to an inner side of the wall of the brewed beverage tank. The indicator guide may comprise a sleeve defining a cylindrical void, such that the indicator is positioned within the void.

The buoyant portion of the indicator may comprise a first cylinder having a first diameter, and the indicating portion of the indicator may comprise a second cylinder positioned substantially perpendicular to the wall having the aperture.

In another embodiment of the invention, a hot beverage maker comprises a stand, a water reservoir, a filter basket to hold beverage grinds to be brewed, a brewed beverage tank for holding a brewed beverage, a dispenser for dispensing the brewed beverage from the brewed beverage tank, and a floating brewed beverage level indicator having a portion that is buoyant and floats on a surface of the brewed beverage and a portion that is visible through an aperture in a side wall of the brewed beverage tank. A position of the visible portion relative to the aperture varies as the amount of the brewed beverage in the brewed beverage tank varies, such that the position indicates the amount of the brewed beverage in the brewed beverage tank.

A portion of the side wall adjacent the aperture may comprise a plurality of markings spaced apart along the aperture, such that the position of the protruding portion relative to the markings indicates the amount of the brewed beverage in the brewed beverage tank.

The buoyant portion of the indicator may comprise a first cylinder having a first diameter, and the visible portion of the indicator may comprise a second cylinder having a second diameter smaller than the first diameter. The second cylinder may be positioned substantially perpendicular to the side wall.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A hot beverage maker with a floating fluid level indicator in accordance with the present invention provides an improved method and apparatus for indicating the amount of a brewed beverage in a brewed beverage tank of the hot beverage maker. The floating fluid level indicator is adapted to slidably protrude through an aperture in a top of the brewed beverage tank, such that a varying portion of the indicator protruding through the aperture corresponds to the amount of the brewed beverage in the brewed beverage tank varies.

Turning to FIGS. 1-4, there is illustrated a hot beverage maker 10 having a floating fluid level indicator. FIGS. 1-4 are, respectively, a front perspective view, a front elevational view, a right side elevational view, and a top plan view of hot beverage maker 10. Beverage or coffee maker 10 comprises a stand 12, a fresh water reservoir (not illustrated) enclosed within the stand, a brewed beverage tank 14, and a lid 16. The stand 12 forms the base of coffee maker 10 and supports the fresh water reservoir and brewed beverage tank 14. The stand 12 includes a recess 19 in which is situated a push-button 18. Lid 16 is rotatably connected, such as via a hinge, to tank 14 or stand 12. The lid is adapted to cover the upper opening of the brewed beverage tank 14. Electronic controls, switches, displays and the like would be included (illustrated but not labeled). A floating brewed beverage indicator 20 (described in greater detail below) protrudes through an aperture 34 in the lid. At least a portion of the indicator 20 is buoyant and floats on a surface of the brewed beverage, thereby causing a varying portion of the indicator 20 to protrude through the aperture 34 as the amount of the brewed beverage in the brewed beverage tank 14 varies. Overall, the specific construction and ornamental design of the beverage maker may vary. Therefore, a product designer or engineer having ordinary skill with the assembly and/or design of beverage makers will be able to create a beverage maker that incorporates the teachings of the present invention while incorporating a different look or different, alternative parts.

Figure 1:
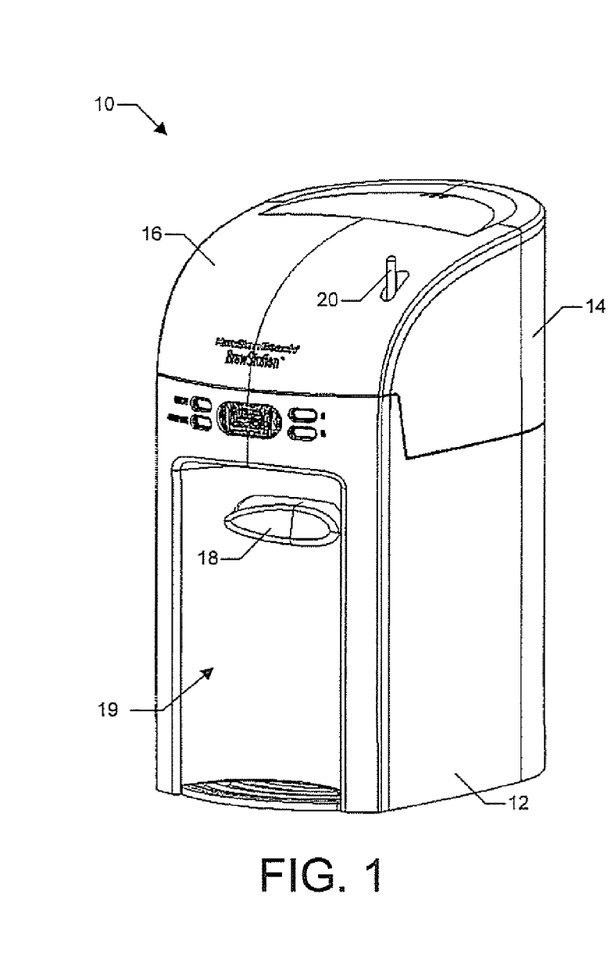
FIG. 1 is a front perspective view of a hot beverage maker, in accordance with one embodiment of the invention.
Figure 2:
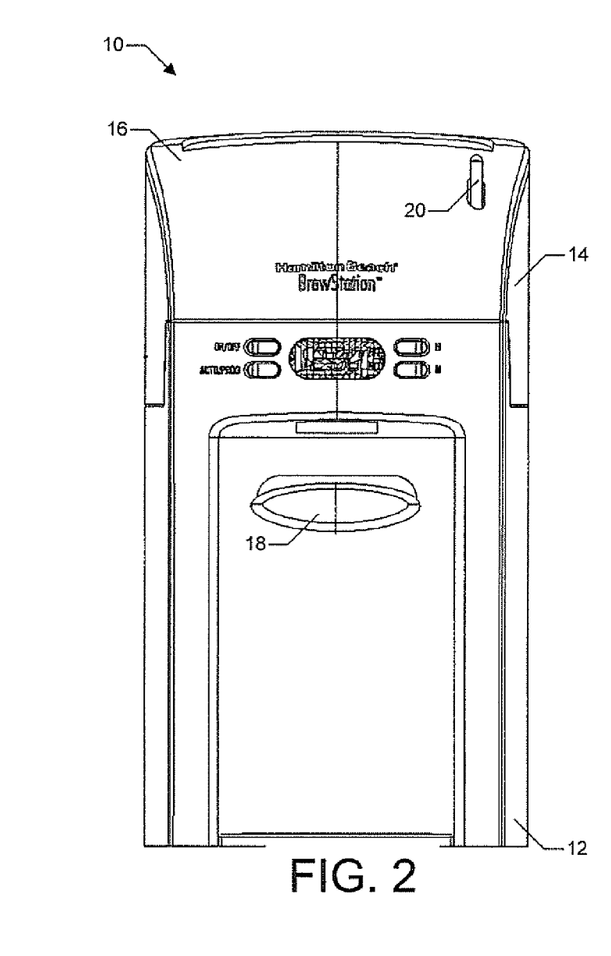
FIG. 2 is a front elevational view of a hot beverage maker, in accordance with one embodiment of the invention.
Figure 3:
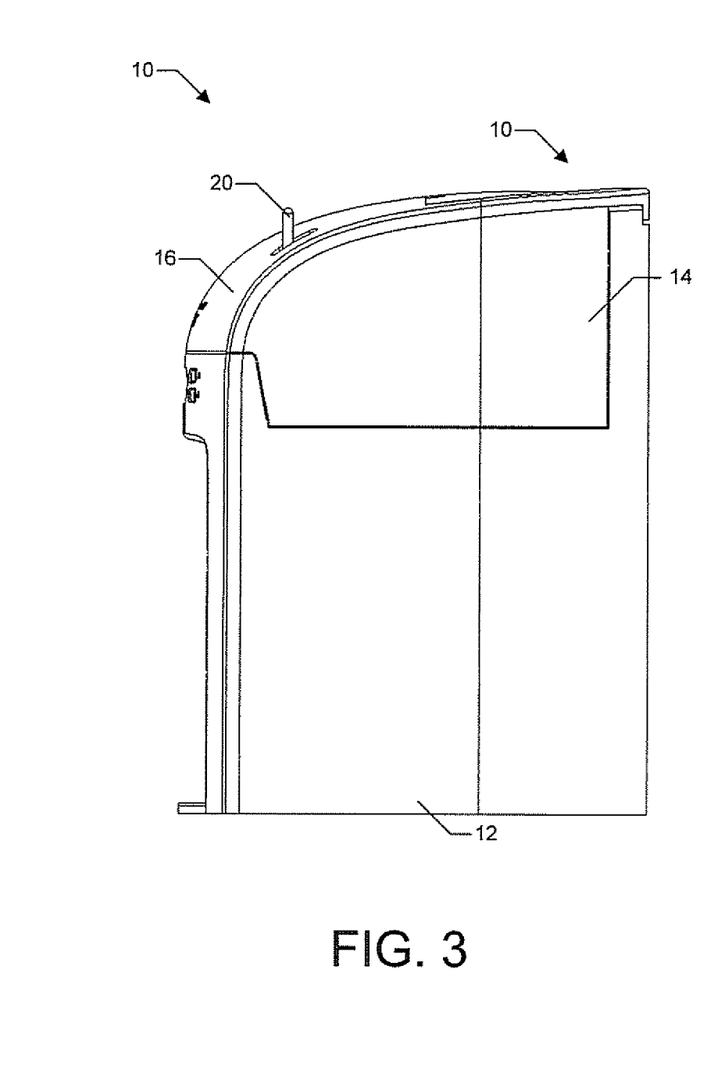
FIG. 3 is a right side elevational view of a hot beverage maker, in accordance with one embodiment of the invention.
Figure 4:
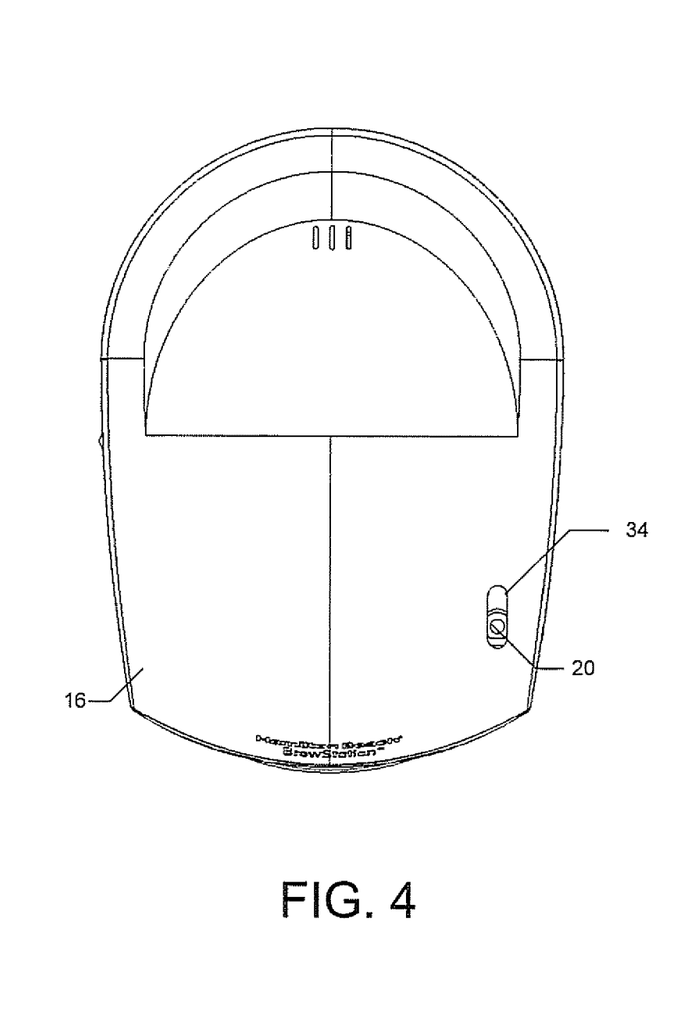
FIG. 4 is a top plan view of a hot beverage maker, in accordance with one embodiment of the invention.
Figure 5:
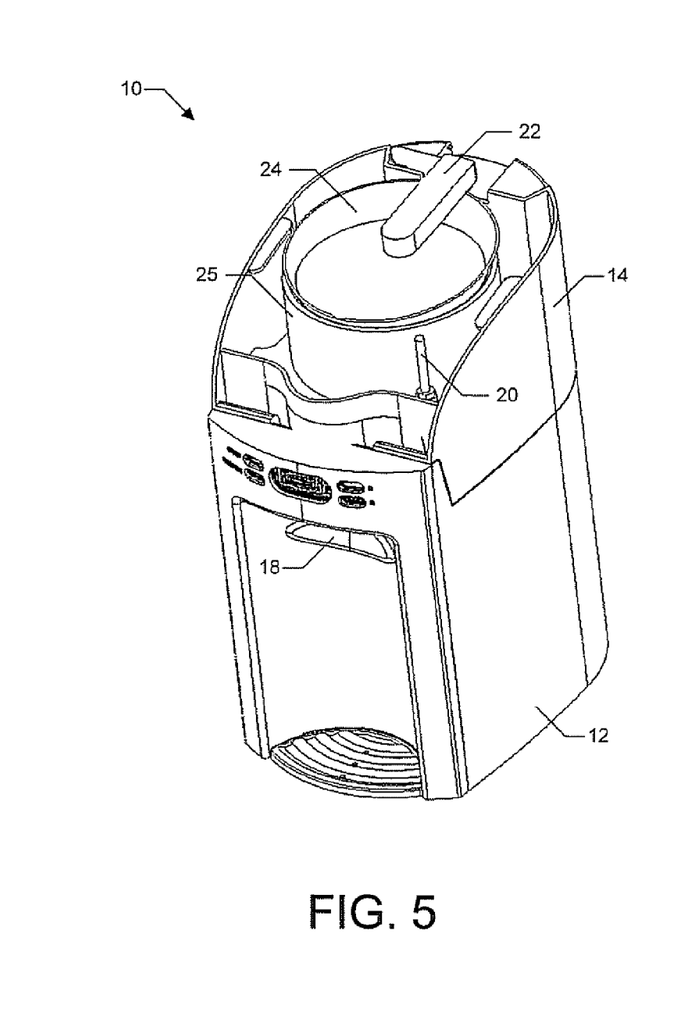
FIG. 5 is a top perspective view of a hot beverage maker with the lid removed, in accordance with one embodiment of the invention.

FIG. 5 illustrates the beverage maker 10 with the lid 16 removed, exposing the interior of the beverage tank 14. A showerhead 22 receives water from the fresh water reservoir via a pipe (not illustrated). The showerhead dispenses water onto the disperser 24. Filter basket 25 is mounted below the disperser. A number of openings (not illustrated) are formed in the bottom of the disperser, and the openings are spaced to enable the water to be relatively evenly distributed over an infusible material (e.g., ground coffee) in the filter basket 25. The filter basket has a depth less than the depth of tank 14, and it includes an opening (not illustrated) at the bottom of the basket for fluid to flow through the basket into the tank 14. In use, fluid in the fresh water reservoir is heated via a heater. A tube fluidly connects the heater to the showerhead, and water heated in the heater is naturally lifted through the tube to the showerhead. With the lid closed, the heated water exits the showerhead onto the disperser, and then exits the disperser and encounters the infusible material held in the filter basket. The resulting brewed beverage flows through the basket opening into tank 14 where it is kept warm via a warmer plate (not illustrated). As can be seen in FIG. 5, the wall of the beverage tank 14 may form the external wall of at least a portion of the beverage maker. However, in an alternative embodiment (not illustrated), the beverage tank may be fully enclosed within a beverage maker housing that is distinct from the beverage tank wall.

Figure 6:
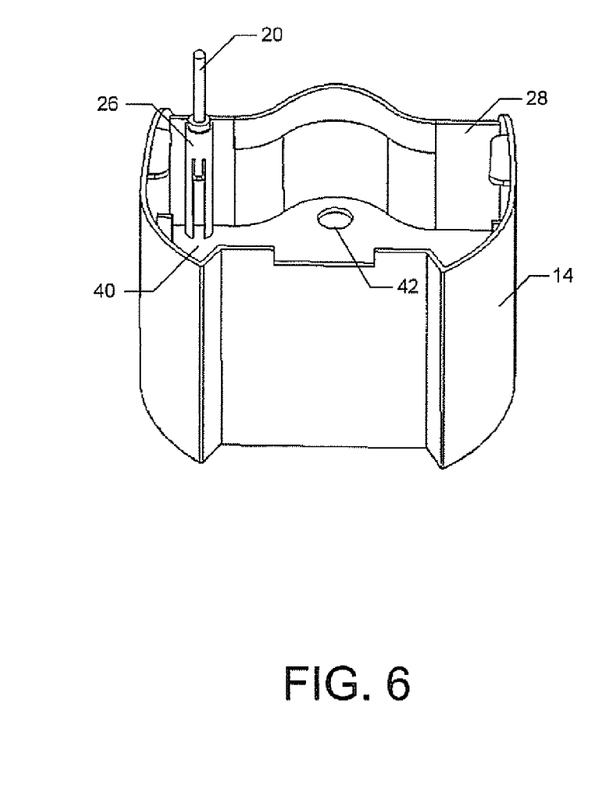
FIG. 6 is a top perspective view of a brewed beverage tank of a hot beverage maker, in accordance with one embodiment of the invention.

Considering also FIG. 6, tank 14 includes a bottom 40 and a wall surrounding the bottom and creating an interior wall 28. The specific shape of the wall may vary in accordance with the aesthetic of structural design of beverage maker 10. The interior wall and bottom define an interior volume of the tank. An outlet port 42 allows fluid in tank 14 to selectively pass out of the tank. Port 42 contains an actuatable plug or piston (not illustrated) to selectively pass a fluid in tank 14 to a container placed within recess 20. Push button 18 is connected to a lever operable to actuate the sealing mechanism in outlet port 42. Outlet port is naturally biased to a closed or sealed position. The lever actuates the port to an open position.

The hot beverage maker 10 may further comprise an indicator guide adapted to enable movement of the floating fluid level indicator only along one axis and between two points along the axis. Thus, the indicator guide of FIG. 6 enables the indicator to move up and down corresponding to, respectively, an increasing or decreasing fluid level in the tank 14. In one embodiment of the invention, as illustrated in FIG. 6, the indicator guide 26 may be attached to the inner wall 28 of the brewed beverage tank, and may comprise a sleeve defining a cylindrical void such that the indicator is positioned within the void. The floating indicator will typically be sized slightly smaller than the inner diameter of the indicator guide, such that wall of the indicator guide would prevent substantial side-to-side movement of the floating indicator. Downward movement of the floating indicator will typically be limited by the bottom 40 of the tank 14. Upward movement will typically be limited by cooperating structures on both the indicator and the indicator guide, such that the structures contact at the desired upward travel limit to prevent further upward movement. For example, the floating indicator may comprise a tab and the indicator guide may comprise a stop, such that the tab contacts the stop when the floating indicator to prevent further upward movement when the indicator has reached the desired upward travel limit.

Figure 7:
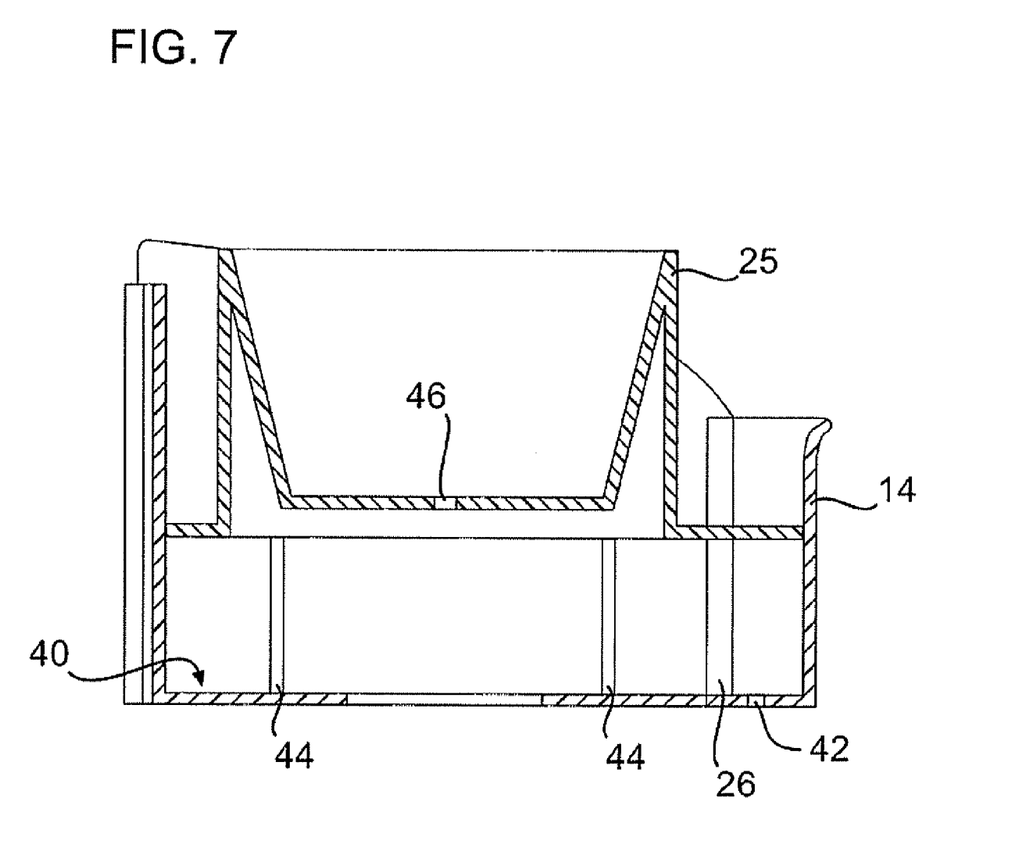
FIG. 7 is a cross-sectional view of a brewed beverage tank and filter basket of a hot beverage maker, in accordance with one embodiment of the invention.

Referring now to FIG. 7, a cross-sectional view of a brewed beverage tank and filter basket of a hot beverage maker is illustrated, in accordance with one embodiment of the invention. As can be seen in FIG. 7, the filter basket 25 sits on support members 44 such that spacing is maintained between the bottom of the filter basket and the bottom 40 of the beverage tank. This spacing enables the brewed beverage to freely flow from the filter basket (through aperture 46) into the beverage tank.

Figure 8A:
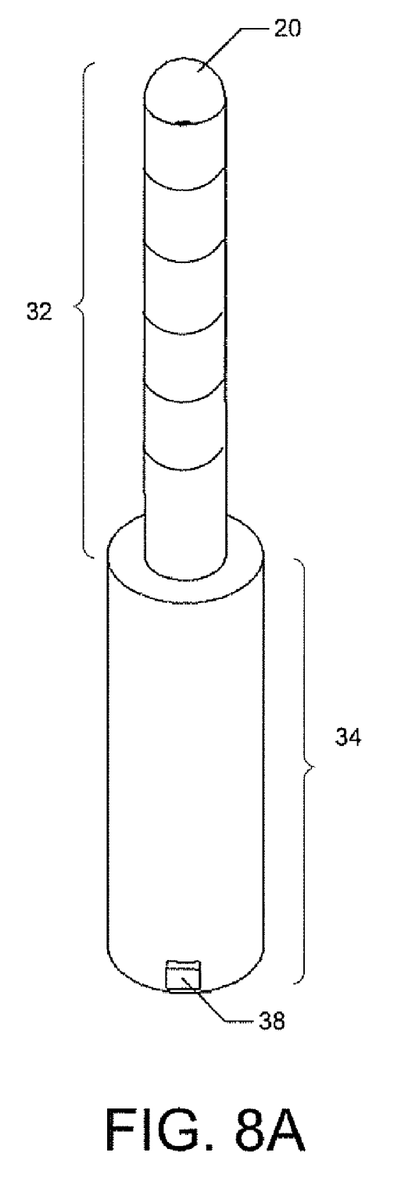
FIGS. 8A, 8B are front and rear perspective views, respectively, of a floating fluid level indicator of a hot beverage maker, in accordance with one embodiment of the invention.
Figure 8B:
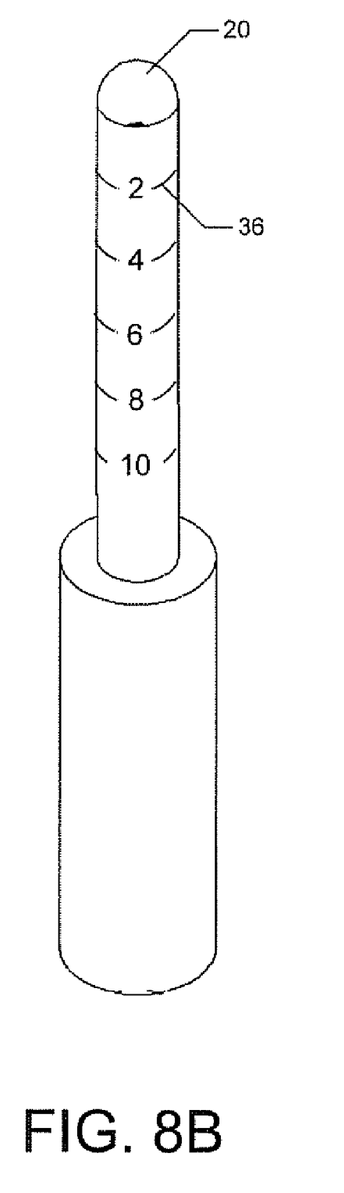

Referring now to FIGS. 8 and 8B, front and rear perspective views, respectively, are illustrated of a floating fluid level indicator 20, in accordance with one embodiment of the invention. The floating indicator may comprise one or more cylinders. The embodiment of FIGS. 8A and 8B comprises two cylinders. The buoyant portion 34 of the indicator comprises a first cylinder with a first diameter, and the protruding portion 32 of the indicator comprises a second cylinder with a second diameter smaller than the first diameter. While the protruding portion is not necessarily also buoyant both the protruding and the buoyant portion may be formed from a buoyant material and it may be typical to form both portions from the same material. Each of the first and second cylinders may be formed separately (either from the same or different material) and then joined together. Alternatively, the first and second cylinders may be formed as a single piece. The indicator may comprise a tab 38 that, as described above, cooperates with a stop on the indicator guide to limit the upward movement of the indicator.

The floating fluid level indicator 20 may comprise a plurality of markings spaced apart along the protruding portion of the indicator, such that a varying number of markings are visible outside of the hot beverage maker as the varying portion of the indicator protrudes through the aperture. As such, the number of visible markings indicates the amount of the brewed beverage in the brewed beverage tank. Each of the visible markings may include a label corresponding to a different amount of brewed beverage in the brewed beverage tank. The number of indicators and labels can vary but will depend, at least in part, on the capacity of tank 14. Each label marks the volume of a fluid in tank 14 when a particular label is the lowest label visible above the lid. The increments and units of measurements may also vary. As illustrated in FIGS. 8A and 8B, tank 14 has a capacity of 10 cups and a labeled indicator marks each even increment of cups from 2 to 10 cups. Alternatively, each labeled indicator may mark a fractional amount corresponding to a relative amount of fluid in the tank (e.g., ½, ½, ¾, Full).

Figure 9:
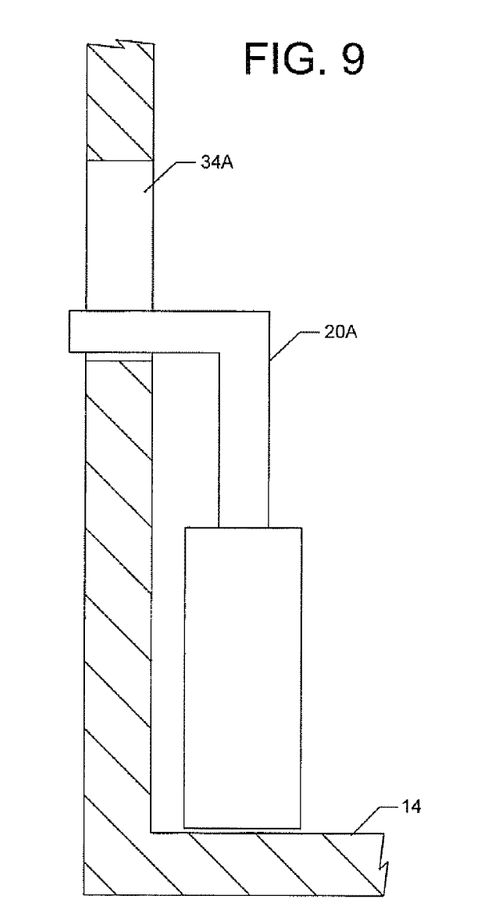
FIG. 9 is a cross-sectional view of an alternative embodiment of a floating fluid level indicator.

Referring now to FIG. 9, a cross-sectional view of an alternative embodiment of a floating fluid level indicator is illustrated. Whereas the entire floating indicator described above is vertical and thus would protrude through the top of the beverage maker, the floating indicator 20A of FIG. 9 is adapted to protrude through a side wall of the beverage tank 14. As used herein, the term "side wall" may refer to a front side wall, a back side wall, a right side wall, or a left side wall.

A portion of the floating indicator protrudes through an aperture 34A in the beverage tank wall. The protruding portion of the indicator may be positioned substantially perpendicular to the side wall, as shown in FIG. 9. As discussed above, the wall 14 of the beverage tank illustrated here forms the external wall of the beverage maker. Thus, the protruding portion is visible to a user of the beverage maker. As the amount of beverage in the beverage tank varies, a position of the protruding portion relative to the aperture varies. As such, the position of the protruding portion within the aperture indicates the amount of the brewed beverage in the brewed beverage tank. The portion of the side wall adjacent the aperture may comprise a plurality of markings (not illustrated) spaced apart along the aperture, such that the position of the protruding portion relative to the markings indicates the amount of the brewed beverage in the brewed beverage tank. Each marking may include a label corresponding to a different amount of brewed beverage in the brewed beverage tank. In such an embodiment as illustrated in FIG. 9, the maximum amount of brewed beverage must be below the bottom of the aperture to prevent the beverage from flowing out of the aperture. The indicator guide is omitted from FIG. 9 for clarity.

Figure 10:
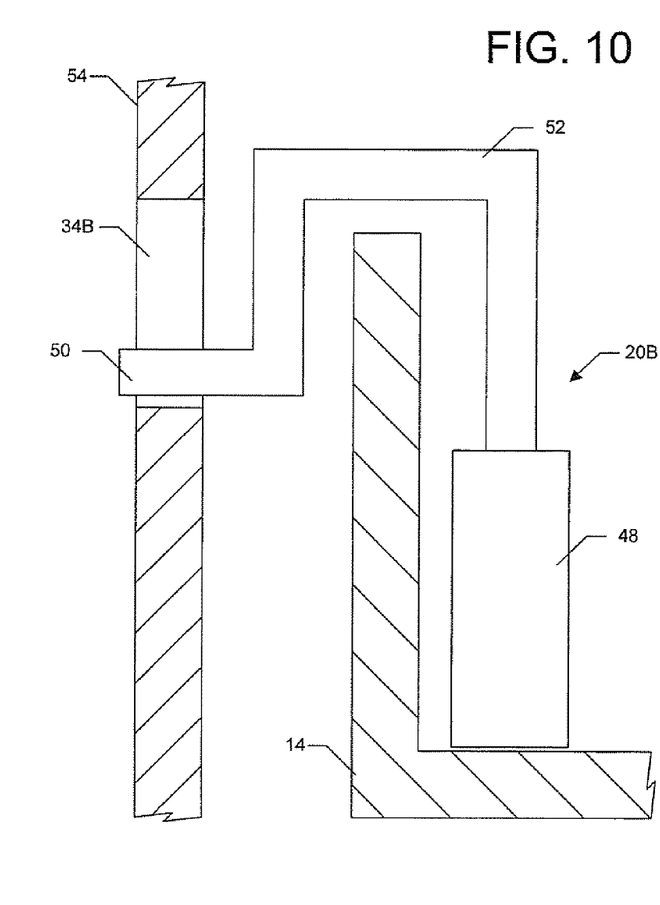
FIG. 10 is a cross-sectional view of another alternative embodiment of a floating fluid level indicator.

Referring now to FIG. 10, a cross-sectional view of another alternative embodiment of a floating fluid level indicator is illustrated. The embodiment of FIG. 10 may be used in a beverage maker in which the beverage tank 14 is fully enclosed within a beverage maker housing 54 that is distinct from the beverage tank wall. The floating indicator 20B of FIG. 10 comprises a buoyant portion 48 located within the brewed beverage tank and adapted to float on a surface of the brewed beverage, an indicating portion 50 adapted to protrude through an aperture 34B in a wall 54 of the hot beverage maker, and a connecting portion 52 adapted to traverse the top edge of the wall 14 of the brewed beverage tank to connect the buoyant portion and the indicating portion. A position of the protruding portion 50 relative to the aperture varies as an amount of the brewed beverage in the brewed beverage tank varies, such that the position indicates the amount of the brewed beverage in the brewed beverage tank. A portion of the wall adjacent the aperture may comprise a plurality of markings (not illustrated) spaced apart along the aperture, such that the position of the protruding portion relative to the markings indicates the amount of the brewed beverage in the brewed beverage tank. Each marking may include a label corresponding to a different amount of brewed beverage in the brewed beverage tank. The indicator guide is omitted from FIG. 10 for clarity.

In such an embodiment as illustrated in FIG. 10, the maximum amount of brewed beverage need only be kept below the top edge of the wall of the beverage tank.

While the embodiment of FIG. 10 is described relating to a beverage tank that is fully enclosed within a beverage maker housing that is distinct from the beverage tank wall, such an embodiment may be used in beverage makers having different configurations. For example, the floating indicator 20B may be used in a beverage maker in which the beverage tank has an inner wall and an outer wall, with the inner wall containing the beverage and the outer wall of the tank forming at least a portion of the external wall of the beverage maker. Alternatively, the floating indicator 20B may be used in a beverage maker similar to that illustrated in FIGS. 1-5 but having an aperture in the substantially vertical portion (i.e., the front portion) of the lid 16 through which the indicating portion 50 protrudes.

While FIGS. 9 and 10 illustrate a floating indicator that complete protrudes through the aperture, in some embodiments the indicator may only partly protrude through the aperture. Thus, the term "protrude" as used herein is intended to encompass an indicator that either fully or partly protrudes through the aperture. In an embodiment in which the indicator only partly protrudes, the aperture may have a transparent cover that is flush with the exterior side of the aperture.

In another embodiment of the invention (not illustrated), a hot beverage maker may comprise a floating brewed beverage level indicator having a portion that is buoyant and floats on a surface of the brewed beverage and a portion that is visible (but does not protrude) through an aperture in a side wall of the brewed beverage tank. A position of the visible portion relative to the aperture varies as the amount of the brewed beverage in the brewed beverage tank varies, such that the position indicates the amount of the brewed beverage in the brewed beverage tank.

While the floating indicator is described herein comprising two or more cylinders, many other shapes and configurations may be employed. As just one example of an alternative shape, the buoyant portion of the indicator may comprise a sphere while the protruding portion comprises a cylinder joined to the sphere.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A hot beverage maker comprising:
    a stand;
    a water reservoir;
    a filter basket to hold beverage grinds to be brewed;
    a brewed beverage tank for holding a brewed beverage;
    a dispenser for dispensing the brewed beverage from the brewed beverage tank; and
    a floating brewed beverage level indicator comprising a buoyant portion located within the brewed beverage tank and adapted to float on a surface of the brewed beverage, an indicating portion adapted to protrude through an aperture in a wall of the hot beverage maker, and a connecting portion adapted to traverse a top edge of a wall of the brewed beverage tank to connect the buoyant portion and the indicating portion;
    wherein a position of the protruding portion relative to the aperture varies as an amount of the brewed beverage in the brewed beverage tank varies, such that the position indicates the amount of the brewed beverage in the brewed beverage tank.

2. The hot beverage maker of claim 1, wherein the wall of the brewed beverage tank is a first tank wall and wherein the wall having the aperture is a second tank wall.

3. The hot beverage maker of claim 1, wherein a portion of the wall adjacent the aperture comprises a plurality of markings spaced apart along the aperture, such that the position of the protruding portion relative to the markings indicates the amount of the brewed beverage in the brewed beverage tank.

4. The hot beverage maker of claim 2, wherein each marking includes a label corresponding to a different amount of brewed beverage in the brewed beverage tank.

5. The hot beverage maker of claim 1, further comprising:
    an indicator guide adapted to enable movement of the indicator only along one axis and between two points along the axis.

6. The hot beverage maker of claim 5, wherein the indicator guide is attached to an inner side of the wall of the brewed beverage tank.

7. The hot beverage maker of claim 5, wherein the indicator guide comprises a sleeve defining a cylindrical void, and wherein the indicator is positioned within the void.

8. The hot beverage maker of claim 1, wherein the buoyant portion of the indicator comprises a first cylinder, and wherein the indicating portion of the indicator comprises a second cylinder positioned substantially perpendicular to the wall having the aperture.

9. A hot beverage maker comprising:
a stand;
a water reservoir;
a filter basket to hold beverage grinds to be brewed;
a brewed beverage tank for holding a brewed beverage;
a dispenser for dispensing the brewed beverage from the brewed beverage tank;
a floating brewed beverage level indicator adapted to protrude through an aperture in a side wall of the brewed beverage tank, at least a portion of the indicator is buoyant and floats on a surface of the brewed beverage, the buoyant portion of the indicator comprises a first cylinder; and
a portion of the indicator protrudes through the aperture and a position of the protruding portion relative to the aperture varies as an amount of the brewed beverage in the brewed beverage tank such that the position of the protruding portion indicates an amount of the brewed beverage in the brewed beverage tank, and the protruding portion of the indicator comprises a second cylinder positioned substantially perpendicular to the side wall.

* * * * *